United States Patent [19]

Pointner

[11] Patent Number: 4,607,472
[45] Date of Patent: Aug. 26, 1986

[54] ANCHOR FOR SECURING STONE PLATES TO A WALL

[76] Inventor: Ferdinand Pointner, Tagwerkerstrasse 34, 4810 Gmunden, Austria

[21] Appl. No.: 742,283

[22] Filed: Jun. 7, 1985

[30] Foreign Application Priority Data

Jun. 8, 1984 [AT] Austria ................................. 1886/84

[51] Int. Cl.⁴ ............................ E04N 1/00; E04B 1/38
[52] U.S. Cl. ........................................ 52/698; 52/702; 52/235; 403/232.1; 403/245; 248/DIG. 1
[58] Field of Search ................ 52/698, 702, 508, 136, 52/137, 139, 513, 573, 235; 403/232.1, 245, 262; 248/298, DIG. 1

[56] References Cited

U.S. PATENT DOCUMENTS

| | | | |
|---|---|---|---|
| 3,550,337 | 12/1970 | Lorenz | 52/235 |
| 3,640,043 | 2/1972 | Querfeld et al. | 52/235 |
| 3,786,605 | 1/1974 | Winfrey | 52/235 |
| 4,064,664 | 12/1977 | Gaul | 52/136 |

FOREIGN PATENT DOCUMENTS

| | | | |
|---|---|---|---|
| 2364370 | 6/1975 | Fed. Rep. of Germany | 52/235 |
| 2437073 | 2/1976 | Fed. Rep. of Germany | 52/235 |
| 212312 | 9/1966 | Sweden | 52/235 |

Primary Examiner—William F. Pate, III
Assistant Examiner—John Malcolm White
Attorney, Agent, or Firm—Karl F. Ross; Herbert Dubno

[57] ABSTRACT

An anchor for securing stone plates to a wall comprises a holder, which is adapted to be bolted to the wall, and an adjustable carrier, which is supported by the holder and has a protruding free end portion, which receives a mandrel that is adapted to be received in bores opening in the edge faces of the stone plates. In order to provide an anchor which is structurally simple and rugged, can carry a high load and yet be exactly adjusted, and can be handled in a particularly convenient manner, the holder comprises a base plate, which is adapted to be secured to the wall, and two juxtaposed fixing legs, which protrude from the base plate, the carrier consists of a tongue plate, which is sandwiched between the fixing legs and is adapted to be fixed in position by means of a clamp screw, which extends through a slot extending in the tongue plate in the longitudinal direction of the legs, said fixing legs have end portions diverging toward their free ends, and the tongue plate is slidably supported by a crosspiece plate, by which free end portions of the fixing legs are interconnected.

8 Claims, 2 Drawing Figures

4,607,472

ANCHOR FOR SECURING STONE PLATES TO A WALL

BACKGROUND OF THE INVENTION

1. Field of the Invention

This invention relates to an anchor for securing stone plates to a wall, comprising a holder, which is adapted to be bolted to the wall, and an adjustable carrier, which is supported by the holder and has a protruding free end portion, which receives a mandrel that is adapted to be received in bores opening in the edge faces of the stone plates.

2. Description of the Prior Art

Such anchors for securing plates of natural stone are intended to hold the stone plates of a facade lining in exactly coordinated positions and to carry such plates in linings of substantial height. Most of the known anchors for securing stone plates consist of straight metal lances, which are more or less twisted or profiled in order to increase their stiffness and which have a flattened end portion that is provided with the transverse mandrel to be inserted into the stone plates. For aligning the several stone plates, each of said anchors must be embedded in mortar in an appropriate depth in the wall. For this reason the setting of said anchors for securing stone plates is a most complicated and time-consuming work and the strength of the fixation of the anchor will depend on the care with which the anchor has been embedded in the mortar. That care cannot be controlled and that method of fixing the anchor in the wall permits only rather inaccurate aligning of the anchor.

It is also known to secure plates by anchors which consist of a holder and a boltlike carrier, which receives the mandrel and has a screw-threaded portion that is screwed into an adjusting nut provided on the holder. As that carrier can be adjusted in that it is rotated, the anchor can be set in that the holder is bolted to the wall and the carrier is rotated to move the mandrel to the desired position for mounting the lining plates. But said known anchors have only a rather small load carrying capacity and in spite of their considerable structural expenditure can be used only as locating anchors rather than as carrying anchors so that they have only a restricted field of application.

SUMMARY OF THE INVENTION

It is an object of the invention to eliminate the disadvantage mentioned above and to provide an anchor which is of the kind described first hereinbefore and is structurally simple and rugged, can carry a high load and yet be exactly adjusted, and can be handled in a particularly convenient manner.

This object is accomplished in accordance with the invention in that the holder comprises a base plate, which is adapted to be secured to the wall, and two juxtaposed fixing legs, which protrude from the base plate, the carrier consists of a tongue plate, which is sandwiched between the fixing legs and is adapted to be fixed in position by means of a clamp screw, which extends through a slot extending in the tongue plate in the longitudinal direction of the legs, said fixing legs have end portions diverging toward their free ends, and the tongue plate is slidably supported by a crosspiece plate, by which free end portions of the fixing legs are interconnected. The base plate is screwed to the wall in such a manner that the center plane between the fixing legs, i.e., the plane of the tongue plate, is vertically oriented so that even an anchor having relatively small dimensions will have a high load carrying capacity in the vertical plane, in which a particularly high load carrying capacity is essential. In spite of its high load carrying capacity, the tongue plate can deflect in response to normal horizontal forces to allow for an expansion as is required for an exact anchoring. The tongue plate is clamped between the fixing legs and has a free end portion that is slidably supported by the crosspiece plate so that forces exerted on the tongue plate will be transmitted to the holder, which by means of its base plate will exert said forces on the wall. The overhang of the anchor can be adjusted in that the clamp screw is loosened and the tongue plate is displaced relative to the fixing legs until the anchor has been adjusted exactly to the desired distance between the wall and the lining plates. When the clamp screw has subsequently been tightened, the anchor is immediately ready to take up a load.

The base plate may have a central portion joined to the fixing legs and end portions which protrude from said central portion toward the wall. In that case the holder can be bolted to the wall in such a manner that any surface irregularity of the walls will be compensated. Besides, the base plate can then be forced against the wall under an initial stress so that it will be held more firmly to the wall.

The strength of the clamped joint between the fixing legs and the tongue plate can be increased within the scope of the invention in that the confronting clamping portions of the inside surfaces of the legs and of the outside edge faces of the tongue are rough or provided with an adhesive coating.

It will also be desirable to interconnect the free end portions of the fixing legs by a crosspiece plate which extends as far as to the base plate and/or to provide the fixing legs with a stop for engaging the tongue plate at that edge thereof which is opposite to the crosspiece plate. Such improved means for supporting the tongue plate will prevent the tongue plate from tilting up even as the mandrel is forced into the bores of the stone plate during the assembling of the lining.

DETAILED DESCRIPTION OF THE PREFERRED EMBODIMENT

Figure 1:
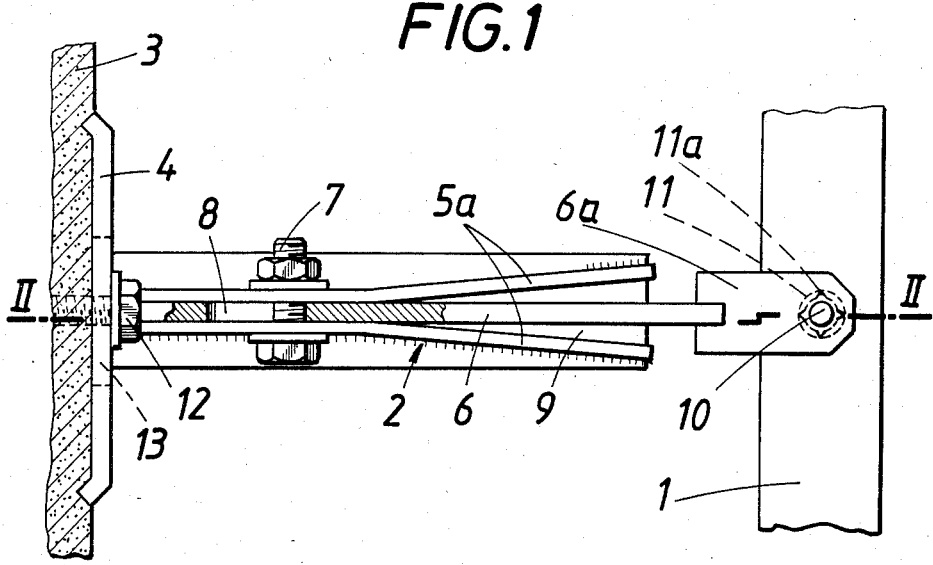
FIG. 1 is a top plan view showing partly in section an anchor which embodies the invention.
Figure 2:
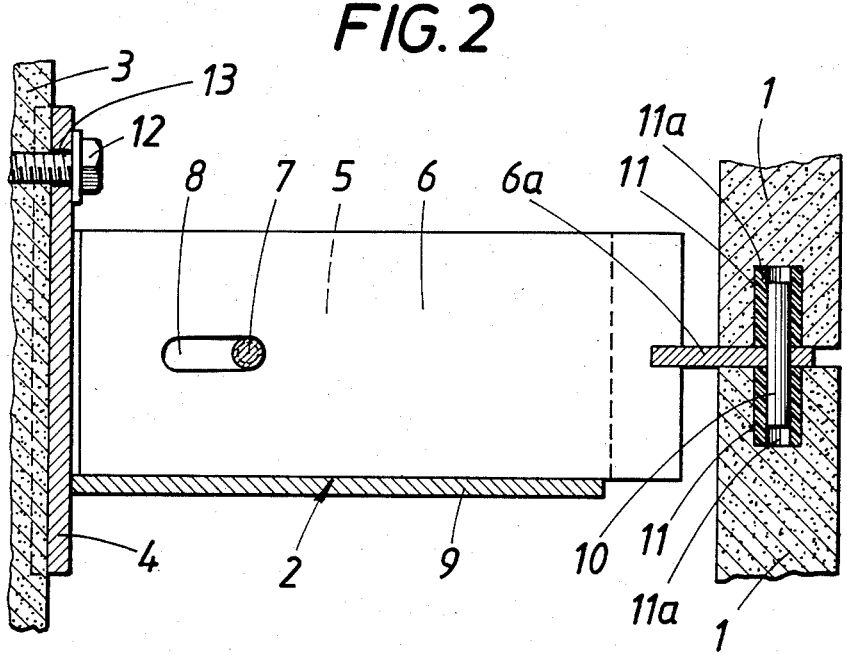
FIG. 2 is a sectional view taken on line II in FIG. 1.

An illustrative embodiment of the invention will now be described more fully with reference to the drawing.

Anchors 2 provided for exactly assembling stone plates 1 in a simple manner to form a facade lining comprise each a base plate 4, which is adapted to be bolted to a wall 3. The base plate 2 and two fixing legs 5 protruding from the base plate 4 on the side that is opposite to the wall 3 constitute a holder for carrying an adjustable tongue plate 6, which constitutes a carrier. The tongue plate 6 is sandwiched between the two fixing legs 5. The tongue plate 6 has a vertical orientation and is formed with a slot 8, which extends along the fixing legs 5. The tongue 6 is clamped between the fixing legs 5 by means of a clamp screw 7, which extends through the slot 8. Those end portions 5a of the fixing legs 5 which are remote from the base plate 4 diverge toward their free ends so that the tongue 6 has a freedom of lateral movement to allow for an expansion. A crosspiece plate 9 extends along and is secured to the fixing legs 5 and slidably supports the tongue plate 6 so that the latter cannot tilt downwardly or upwardly. As a result, the tongue plate 4 is held in position by a holder which has a high load carrying capacity. Because any forces exerted on the tongue plate will act substantially in the vertical plane of the tongue plate, the tongue plate can withstand high loads in spite of its lateral flexibility so that even an anchor 2 having relatively small dimensions will have the desired load carrying capacity.

The stone plates 1 are fixed by means of a bracket 6a, which is provided at the free end of the tongue plate 6 and carries a mandrel 10, which extends into bores 11 formed in the stone plates 1. Plastic sleeves 11a which are star-shaped in cross-section have been fitted into the bores 11 in order to ensure that the mandrel will be firmly fitted regardless of tolerances.

When it is desired to fix the anchor 2 to a wall, the base plate 4 is secured by means of a bolt 12 into an expansion sleeve that has been inserted into the wall 3. The base plate 4 may have a transverse slot 13, through which the bolt 12 may be inserted into the sleeve even when the bore containing the sleeve is eccentric with respect to the base plate. When the clamp screw 7 has been loosened, the tongue plate 6 is displaced relative to the fixing legs 5 to a position corresponding to the desired spacing of the stone plates 1 from the wall 3. When the clamp screw 7 is then tightened to fix the tongue plate in its adjusted position, the anchor has been set and adjusted. Very large forces and moments can be taken up in the plane of the tongue and can be transmitted into the wall 3 and in spite of that high load carrying capacity the tongue plate will remain laterally deflectable so as to allow for an expansion.

I claim:

1. In an anchor for securing stone plates to a wall, comprising
    a holder,
    fixing means for fixing said holder to a wall disposed on one side of said holder,
    a carrier, which is adjustably supported by said holder and extends from said holder on the opposite side thereof and has a free end portion remote from said holder, and
    a mandrel carried by said carrier at said free end portion and adapted to be inserted into bores formed in adjacent edge faces of said stone plates,
    the improvement residing in that
    said holder comprises a base plate provided with said fixing means and two transversely spaced apart fixing legs protruding from said base plate on said opposite side and having free end portions which are remote from said base plate and diverge toward their free ends, said legs also having parallel portions extending between said free end portions and said base plate and formed with coaxial holes, and a crosspiece plate connecting said free end portions
    said carrier comprises a tongue plate, which is sandwiched between said parallel portions and clear of both said free end portions and has two mutually opposite side edges, one of which is in sliding contact with said crosspiece plate, said tongue being formed with a slot extending parallel to said parallel portions and transversely aligned with said coaxial holes, and
    a clamp screw extending through said coaxial holes and said slot and adapted to fix said tongue to said fixing legs.

2. The improvement set forth in claim 1, wherein said fixing means comprise a fixing hole in said base plate and a bolt extending through said fixing hole.

3. The improvement set forth in claim 1, wherein
    said base plate has a central portion provided with said fixing means and has mutually opposite edge portions laterally protruding from said central portion on said one side and
    said fixing legs are joined to said central portion.

4. The improvement set forth in claim 1, wherein high-friction interfaces are provided between said parallel portions and said tongue.

5. The improvement set forth in claim 4, wherein said high-friction interfaces comprise rough surfaces.

6. The improvement set forth in claim 4, wherein said high-friction interfaces comprise adhesive-coated surfaces.

7. The improvement set forth in claim 1, wherein said crosspiece plate extends as far as to said base plate.

8. The improvement set forth in claim 1, wherein
    said fixing legs carry a stop for engaging said tongue at its side edge that is opposite to said crosspiece plate.

* * * * *